United States Patent
Ono

(10) Patent No.: US 6,392,814 B1
(45) Date of Patent: May 21, 2002

(54) MICROSCOPE OBJECTIVES LENS

(75) Inventor: Kenji Ono, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/897,398

(22) Filed: Jul. 3, 2001

(30) Foreign Application Priority Data

Jul. 5, 2000 (JP) ...................... 2000-204179

(51) Int. Cl.$^7$ .......................... G02B 21/02; G02B 13/14
(52) U.S. Cl. ....................... 359/661; 359/356; 359/656
(58) Field of Search ................. 359/368, 385, 359/354–357, 656–661, 689

(56) References Cited

U.S. PATENT DOCUMENTS

| | | | | |
|---|---|---|---|---|
| 4,588,264 A | * | 5/1986 | Shimizu | ...................... 359/658 |
| 5,469,299 A | * | 11/1995 | Nagano | ....................... 359/357 |
| 5,739,958 A | * | 4/1998 | Abe | ............................. 359/656 |
| 5,861,996 A | * | 1/1999 | Yamaguchi | .................. 359/656 |

FOREIGN PATENT DOCUMENTS

| | | | | |
|---|---|---|---|---|
| JP | 61-275812 | * | 12/1986 | ................. 359/661 |
| JP | 3-188407 | | 8/1991 | |
| JP | 7-020385 | | 1/1995 | |

* cited by examiner

Primary Examiner—Thong Nguyen
(74) Attorney, Agent, or Firm—Miles & Stockbridge P.C.

(57) ABSTRACT

A microscope objective lens of the present having, in the order from the object side, a first lens group, a second lens group and a third lens group. The first lens group comprises a meniscus lens with its concave surface facing the object side and a plurality of cemented lenses, and has a positive refractive power on the whole. The second lens group comprises a plurality of cemented lenses and has a positive refractive power on the whole. The third lens group comprises a plurality of cemented lenses and having a negative refractive power on the whole, and fulfills the following conditions (1) to (3):

$$2.5 < f1/f < 5 \quad (1)$$

$$30 < f2/f < 70 \quad (2)$$

$$15 < |f3/f| < 30 \quad (3)$$

where f1 is the focal length of the first lens group, f2 is the focal length of the second lens group, f3 is the focal length of the third lens group, and f is the focal length of the whole microscope objective lens system.

6 Claims, 5 Drawing Sheets

MICROSCOPE OBJECTIVES LENS

This application claims the benefit of Japanese Patent application No. 2000-204179 which is hereby incorporated by reference.

BACKGROUND OF THE INVENTION

1. Field of the Invention

This invention relates to an objective lens having a long working distance and a magnification of about 50, and more particularly to an objective lens used in optical systems such as microscopes which utilize ultraviolet light.

2. Related Background Art

Objective lenses for an ultraviolet region of around 250 nm wavelength include, e.g., a lens disclosed in Japanese Patent Application Laid-Open No. 7-20385. This lens is an objective lens constituted of i) a first lens group which has cemented lens groups each composed of a convex lens and a concave lens, and ii) a second lens group which comprises two or more cemented lens groups, at least one of which includes a triple cemented lens. Correction of aberrations has been made simultaneously for the visible region and the near-ultraviolet region An ultraviolet objective lens disclosed in Japanese Patent Application Laid-Open No. 3-188407 also has a high NA (numerical aperture) and a high magnification, where color correction has been made over the range of from the visible region to the ultraviolet region and a part of lenses can be set floating in accordance with service wavelength. Herein, "floating" is meant to move lens groups so as to make aberrations small in accordance with service wavelength while keeping the length of the whole optical system at a constant value.

In these conventional cases, the lenses can be used under ultraviolet light when used for the inspection of wafers, inspection of pits of, e.g., digital video disks (DVD) and inspections of, e.g., hard disk drives (HDD). However, when used in a microscope incorporated with an automatic focus detector which emits near-infrared light onto an object surface to be observed, to detect focal position on the object surface on the basis of the light which casts back therefrom, it is difficult for the object surface to be focused because the near-infrared light or near-ultraviolet light is not at the same focal position with the ultraviolet light.

The ultraviolet objective lens disclosed in Japanese Patent Application Laid-Open No. 3-188407 also has a disadvantage of poor operability because it is a lens some part of which is set floating in accordance with service wavelength and also it has a very short working distance (WD).

In the case when objective lenses are used in the near-ultraviolet region, some materials constituting an optical system may cause an abrupt fall of transmittance or may cause solarization. Accordingly, there is a limitation on the materials to be used. In particular, where the wavelength is 300 nm or shorter, mediums usable as glass materials are necessarily limited to quartz and fluorite. These optical materials have a small difference in Abbe constants, but the chromatic aberration can sufficiently be corrected by using triplets in a large number as cemented lenses. However, any cement is not available which has a sufficient transmittance at around a wavelength $\lambda$ of 250 nm and has a good operability and a superior cementing force. Thus, there has been a problem that those making use of highly precise triple cemented lenses in a large number have had a difficulty in manufacture.

Moreover, the light used for observation and that for automatic detection of focal points are different in wavelength from each other. Hence, because of the above limitations on optical materials to be used, it is difficult to materialize an objective lens in which image planes in respect of the light having wavelength used for observation and the light having wavelength for automatic detection of focal points have been brought into substantial agreement and at the same time a high numerical aperture and a high magnification have been ensured and also the longitudinal chromatic aberration of two wavelengths has been corrected. There has also been such a problem.

SUMMARY OF THE INVENTION

The present invention was made taking account of the above problems. Accordingly, an object of the present invention is to provide a microscope objective lens which is durable against its use in the ultraviolet region, near-ultraviolet region and near-infrared region and in which materials having ensured a sufficient transmittance are used and at the same time the longitudinal chromatic aberration and various aberrations have well been corrected, also having a relatively long working distance.

To achieve the above object, the present invention provides a microscope objective lens comprising, in order from the object side, a first lens group, a second lens group and a third lens group;

said first lens group comprising a meniscus lens with its concave surface facing the object side and a plurality of cemented lenses, and having a positive refractive power on the whole;

said second lens group comprising a plurality of cemented lenses and having a positive refractive power on the whole; and said third lens group comprising a plurality of cemented lenses and having a negative refractive power on the whole;

the lens fulfilling the following conditions (1) to (3):

$$2.5 < f1/f < 5 \tag{1}$$

$$30 < f2/f < 70 \tag{2}$$

$$15 < |f3/f| < 30 \tag{3}$$

where;

f1 is the focal length of the first lens group;

f2 is the focal length of the second lens group:

f3 is the focal length of the third lens group; and f is the focal length of the whole microscope objective lens system.

According to the present invention, a microscope objective lens can be provided which is durable against its use in the ultraviolet region, near-ultraviolet region and near-infrared region and in which materials having ensured a sufficient transmittance are used and at the same time the longitudinal chromatic aberration and various aberrations have well been corrected, also having a relatively long working distance.

DESCRIPTION OF THE PREFERRED EMBODIMENTS

Figure 1:
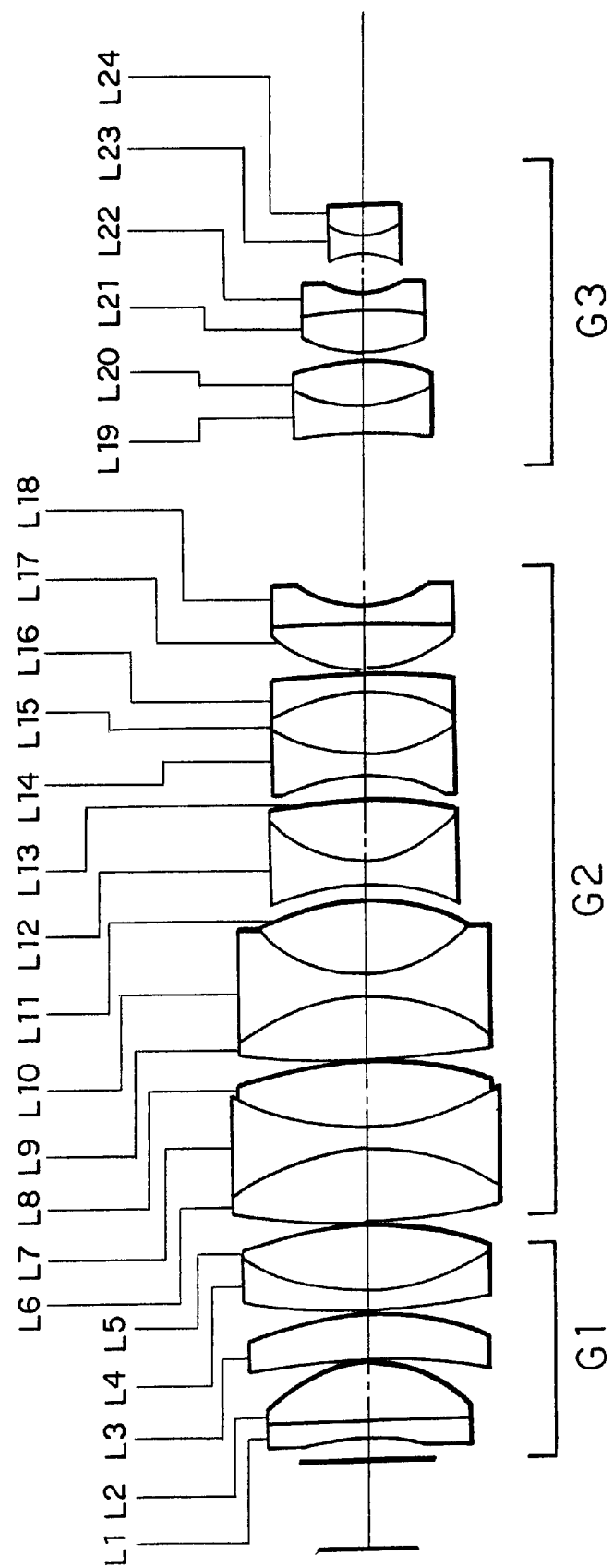
FIG. 1 illustrates the lens construction of a microscope objective lens according to a first embodiment of the present invention.

The microscope objective lens of the present invention has, in the order from the object side, a first lens group, a second lens group and a third lens group. The first lens group comprises a meniscus lens with its concave surface facing the object side and a plurality of cemented lenses, and has a positive refractive power on the whole, the second lens group comprises a plurality of cemented lenses and has a positive refractive power on the whole, and the third lens group comprises a plurality of cemented lenses and has a negative refractive power on the whole, and fulfills the following conditions (1) to (3):

$$2.5 < f1/f < 5 \quad (1)$$

$$30 < f2/f < 70 \quad (2)$$

$$15 < |f3/f| < 30 \quad (3)$$

where f1 is the focal length of the first lens group, f2 is the focal length of the second lens group, f3 is the focal length of the third lens group, and f is the focal length of the whole microscope objective lens system.

The condition (1) is a condition for ensuring the necessary working distance and also bringing residual secondary spectra of the longitudinal chromatic aberration into a correctable range. If the value is outside the upper limit of the condition (1), the lens can have a longer working distance but may have an undesirable longitudinal chromatic aberration in respect of residual-secondary spectra. If on the other hand the value is outside the lower limit of the condition (1), the first lens group may undesirably have too strong a power to balance with the second lens group in the correction of spherical aberration.

The condition (2) is a condition which defines a proper range of the focal length of the second lens group. If the value is outside the upper limit of the condition (2), the second lens group may have so weak a refractive power as to have an undesirable spherical aberration in respect of the light in the range of dolor correction width of ±3 nm with respect to the reference wavelength λ of 248 nm. If it is attempted to change the cementing surface of each lens so as to avoid this, the lens may have undesirable long-wavelength-side spherical aberration and short-wavelength-side comatic aberration, making it impossible to effect any sufficient correction of aberrations. If on the other hand the value is outside the lower limit of the condition (2), the second lens group may have too strong a refractive power. This may lower the height of light rays to make them unable to enter the second lens group G3, making it impossible to effect any good correction of aberrations.

The condition (3) is a condition which defines the focal length of the third lens group having a negative refractive power. If the value is outside the upper limit of the condition (3), the third lens group may have so weak a refractive power as to make the spherical aberration undesirable in respect of the light having the reference wavelength λ of 248 nm and make the image plane curve. If it is attempted to change the refractive power of each lens so as to avoid this, the image plane may more greatly curve, making it impossible to effect any sufficient correction of aberrations. If on the other hand the value is outside the lower limit of the condition (3), the third lens group may have too strong a refractive power, so that the third lens group may have too weak a refractive power to effect any sufficient correction of longitudinal chromatic aberration, spherical aberration and comatic aberration. The lower limit value and upper limit value of the condition (3) may more preferably be 20 and 25, respectively, because the present invention can be made much more effective.

In a preferred embodiment of the present invention, it is preferable to use the cemented lens in plurality in such a case, in order to achieve a state having neither longitudinal chromatic aberration nor chromatic aberration of magnification, the cemented lenses in the first lens group G1 and second lens group G2 may preferably be achromatic lenses, and the cemented lenses in the third lens group G3 be chromatic lenses. Accordingly, the lenses may preferably be so formed that the Abbe constant of positive lenses is larger than the Abbe constant of negative lenses, of the cemented lenses in the first lens group G1 and second lens group G2, and the Abbe constant of positive lenses is smaller than the Abbe constant of negative lenses, of the cemented lenses in the third lens group G3.

In a preferred embodiment of the present invention, as glass materials which constitute respective lens components, it is also preferable to use not only fluorite and quartz but also strontium fluoride and barium fluoride. It is well known to constitute an optical system by using at least two types of glass materials in order to correct chromatic aberration. Especially in the case of objective lenses which transmit ultraviolet light and near-infrared light, it is preferable to use only materials having a sufficient transmittance over the wavelength of from around 200 nm to around 800 nm, such as fluorite, quartz, strontium fluoride and barium fluoride.

In a preferred embodiment of the present invention, it is also preferable to use as a cement for cementing each lens component a fluoroplastic(s). Cements commonly used under visible light tend to absorb ultraviolet light to cause deterioration of optical transmission properties as a result of irradiation for a long time. In particular, epoxy-type cements may change in color into yellow or brown as a result of irradiation by ultraviolet light having a wavelength λ of 365 nm or shorter. Hence, it is not preferable to use them in objective lenses. Also, additive(s) such as stabilizing agent, decomposer or the like contained in the cement may absorb the λ 365 nm or shorter ultraviolet light to be decomposed in the cement and colored, so that the cement layer(s) in the interiors of lenses may become cloudy to damage the original optical performance.

A fluoroplastic has superior resistance to ultraviolet rays, moisture resistance, weatherability and chemical resistance. Accordingly, a fluoroplastic used as a cement according to the present invention is required to comprise carbon and fluorine only as its constituent elements, but has no other limitation. The fluoroplastic has no particular limitation in its structure and may have a ring, linear or branched structure, as well as a cross-linked structure. The use of such substance as above may provide the optical system which can be used in a stable state in the present invention, as examples of the substance comprising carbon and fluorine, the cement may be comprised of any of fluoropolymers such as CYTOP (trade name of Asahi Glass Company (Japan)) or Teflon AF (trade name of Dupon-Mitsui Company (Japan)), and fluororubbers.

Figure 5:
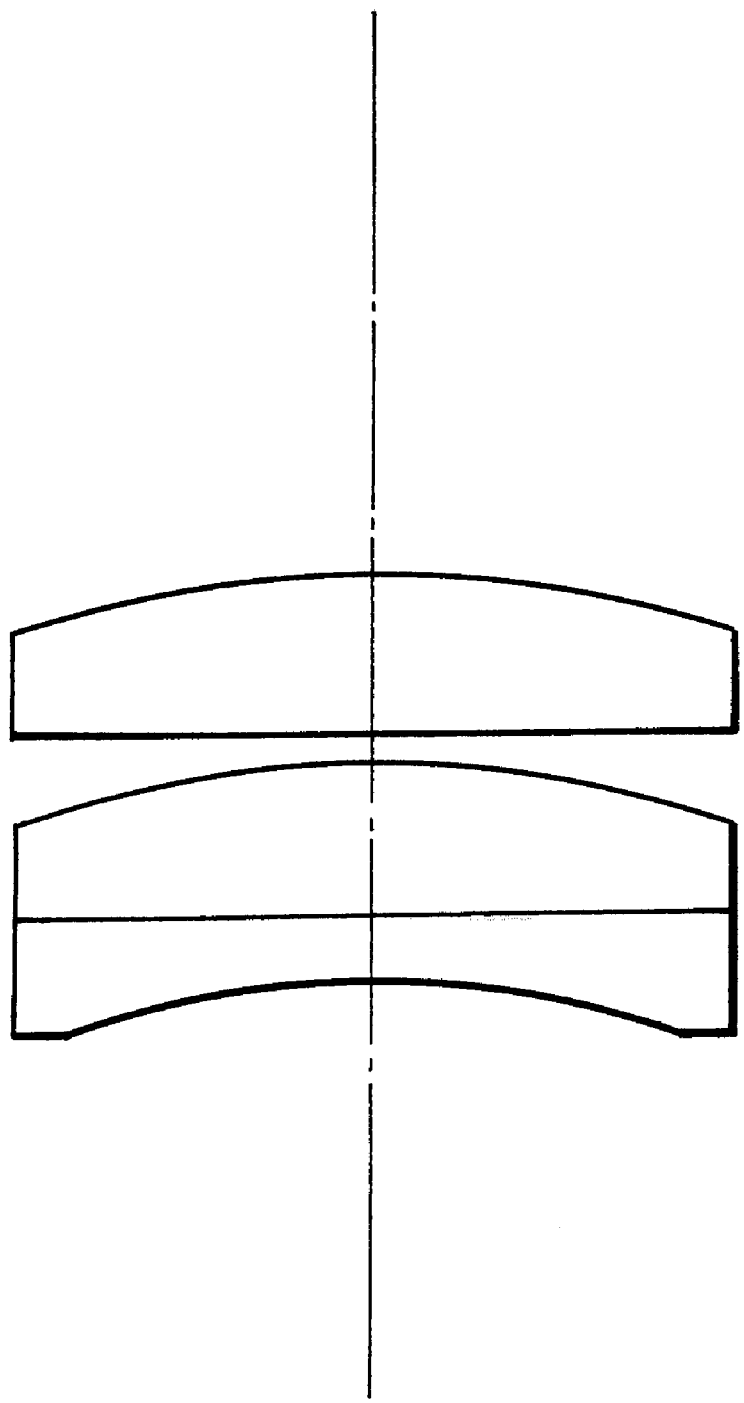
FIG. 5 illustrates the lens construction of an imaging lens.

Embodiments of the microscope objective lens according to the present invention are described below with reference to the accompanying drawings. All embodiments are designed in an infinity system. Also, when used actually as objective lenses of microscopes, for example, an imaging lens constructed as shown in FIG. 5 is provided on the image side. Specific values of this imaging lens are described later.

First Embodiment

FIG. 1 illustrates the lens construction of a microscope objective lens according to First Embodiment. This microscope objective lens comprises, in order from the object side, a first lens group G1, a second lens group G2 and a third lens group G3. The first lens group G1 comprises a meniscus lens with its concave surface facing the object side and a plurality of cemented lenses, and has a positive refractive power on the whole, the second lens group G2 comprises a plurality of cemented lenses and has a positive refractive power on the whole and the third lens group G3 comprises a plurality of cemented lenses and has a negative refractive power on the whole.

Specific values of the present Embodiment are listed in Table 2. In the whole specific values, f is the focal length of the whole system at the time of infinity with respect to light rays of 248 nm wavelength, and is the specific value itself without using the above imaging lens. Also, NA represents the numerical aperture on the object side; β, the magnification; and W.D., a value corresponding to the working distance, i.e., the distance between the object plane and the vertex of front lens surface. In the lens data, the left-end numerical values represent the order of lenses counted in order of incidence of light rays; R, the curvature radius of lens surface; d, the distance between lens surfaces; and Material, the name of a material. The refractive index of each material to each wavelength is also shown in Table 1. In Table 1, the columns corresponding to n248 and n486 provide refractive indexes to light of 248 nm wavelength and 486 nm wavelength, respectively. Also, ν represents the Abbe constant of each lens on the basis of light of 248 nm wavelength λ, and is expressed by the following equation.

$$\nu = (n248-1)/(n248-n486)$$

TABLE 1

| Material | n248 | n486 | ν |
|---|---|---|---|
| Quartz | 1.508569 | 1.463166 | 11.201 |
| Fluorite | 1.468016 | 1.437019 | 15.098 |
| SrF$_2$ | 1.474122 | 1.441252 | 14.424 |
| BaF$_2$ | 1.519923 | 1.478546 | 12.565 |

In specific values in all Embodiments given below, the same letter symbols as those in the present Embodiment are used. Also, "mm" is commonly used as the units of length of focal length, curvature radius, surface distance and others. However, the units are by no means limited thereto because optical systems can provide equivalent optical performances even when magnified or reduced proportionally.

TABLE 2

Total specific values
f = 4.02
NA = 0.55
β = 50X
W.D. = 7.485
Lens data

| No. | R | d | Material | |
|---|---|---|---|---|
| 1 | 0.00 | 7.485 | | |
| 2 | -24.4298 | 1.30 | Quartz | L1 |
| 3 | -127.5017 | 4.10 | Fluorite | L2 |
| 4 | -9.2053 | 0.10 | | |
| 5 | -46.0400 | 3.10 | Fluorite | L3 |
| 6 | -20.8995 | 0.15 | | |
| 7 | 47.9329 | 1.30 | Quartz | L4 |
| 8 | 15.6025 | 4.50 | Fluorite | L5 |
| 9 | -24.7360 | 0.15 | | |
| 10 | 50.5372 | 4.90 | Fluorite | L6 |
| 11 | -15.4830 | 1.35 | BaF$_2$ | L7 |
| 12 | 17.6252 | 4.55 | Fluorite | L8 |
| 13 | -28.3871 | 0.10 | | |
| 14 | 64.3340 | 4.50 | Fluorite | L9 |
| 15 | -13.7278 | 1.30 | Quartz | L10 |
| 16 | 9.8383 | 5.25 | Fluorite | L11 |
| 17 | -17.1234 | 1.10 | | |
| 18 | -14.8275 | 1.30 | Quartz | L12 |
| 19 | 7.7813 | 4.50 | Fluorite | L13 |
| 20 | -26.2162 | 1.50 | | |
| 21 | -13.8401 | 1.30 | Quartz | L14 |
| 22 | 10.8989 | 4.50 | SrF$_2$ | L15 |
| 23 | -11.2815 | 1.30 | Quartz | L16 |
| 24 | -45.5926 | 0.11 | | |
| 25 | 9.2155 | 3.20 | Fluorite | L17 |
| 26 | -301.0727 | 1.35 | Quartz | L18 |
| 27 | 8.3953 | 11.50 | | |
| 28 | -38.8726 | 1.90 | Fluorite | L19 |
| 29 | 11.1236 | 3.20 | Quartz | L20 |
| 30 | -11.8642 | 0.30 | | |
| 31 | 8.1297 | 3.10 | Quartz | L21 |
| 32 | -25.3738 | 1.30 | Fluorite | L22 |
| 33 | 6.0366 | 2.50 | | |
| 34 | -5.6201 | 1.30 | Fluorite | L23 |
| 35 | 4.5665 | 2.00 | Quartz | L24 |
| 36 | 28.1701 | | | |

Condition-corresponding values
f1/f3 = 3.57
f2/f ' 60.5
|f3/f| = 20.47

Figure 2:
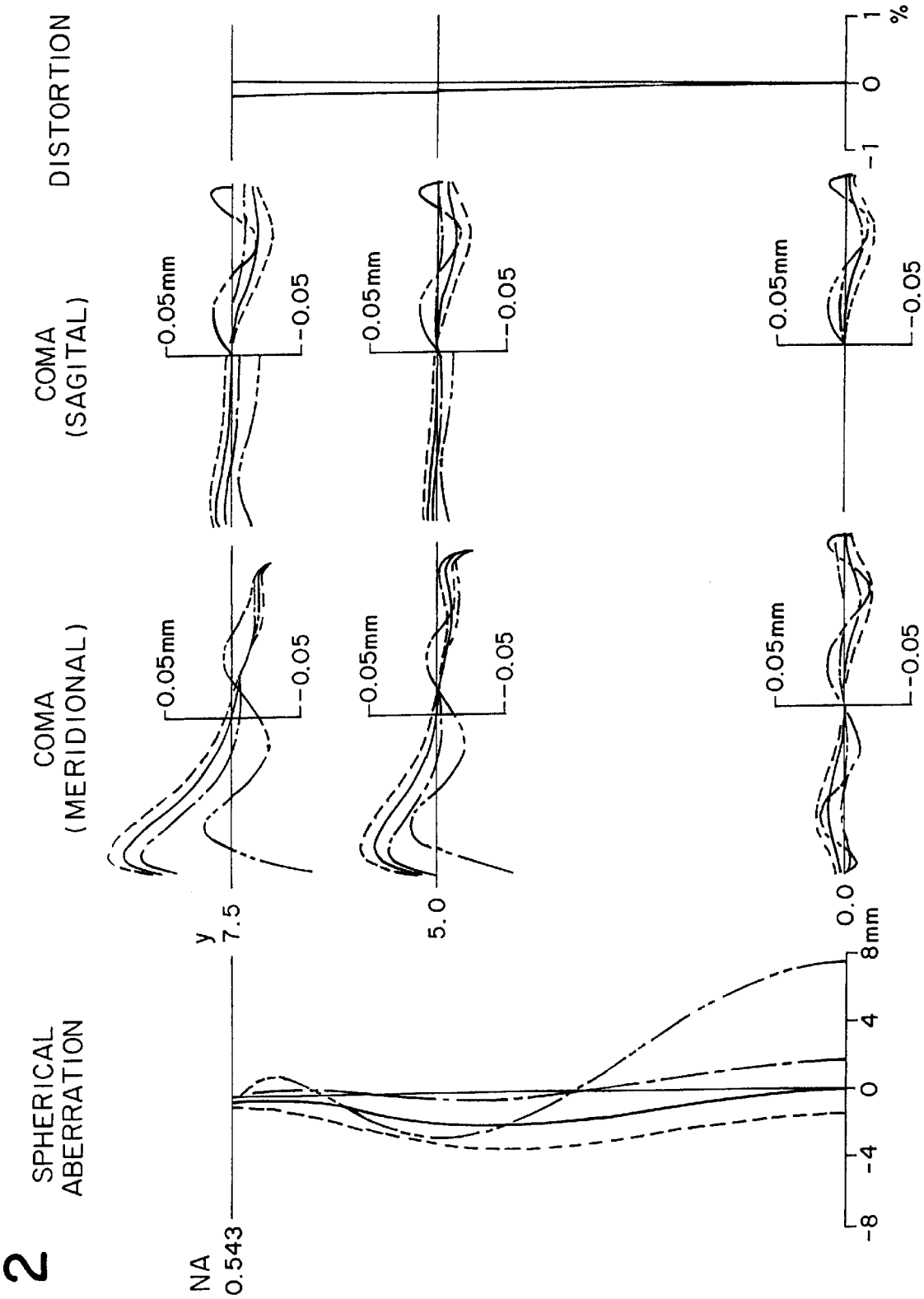
FIG. 2 presents diagrams showing various aberrations of the microscope objective lens according to the first embodiment.

FIG. 2 presents diagrams showing various aberrations of the microscope objective lens according to the present Embodiment. In the aberration diagrams, solid lines each indicate aberration at 248 nm, broken lines 251 nm, chain lines 245 nm, and chain double-dashed lines 486 nm. In aberration diagrams in all Embodiments given below, the same indications as those in the present Embodiment are used. Also, the aberration diagrams in all Embodiments are drawn from images formed using the imaging lens mentioned above.

As can be seen from the aberration diagrams, various aberrations have well been corrected at wavelengths of 248±3 nm and 486 nm.

Second Embodiment

Figure 3:
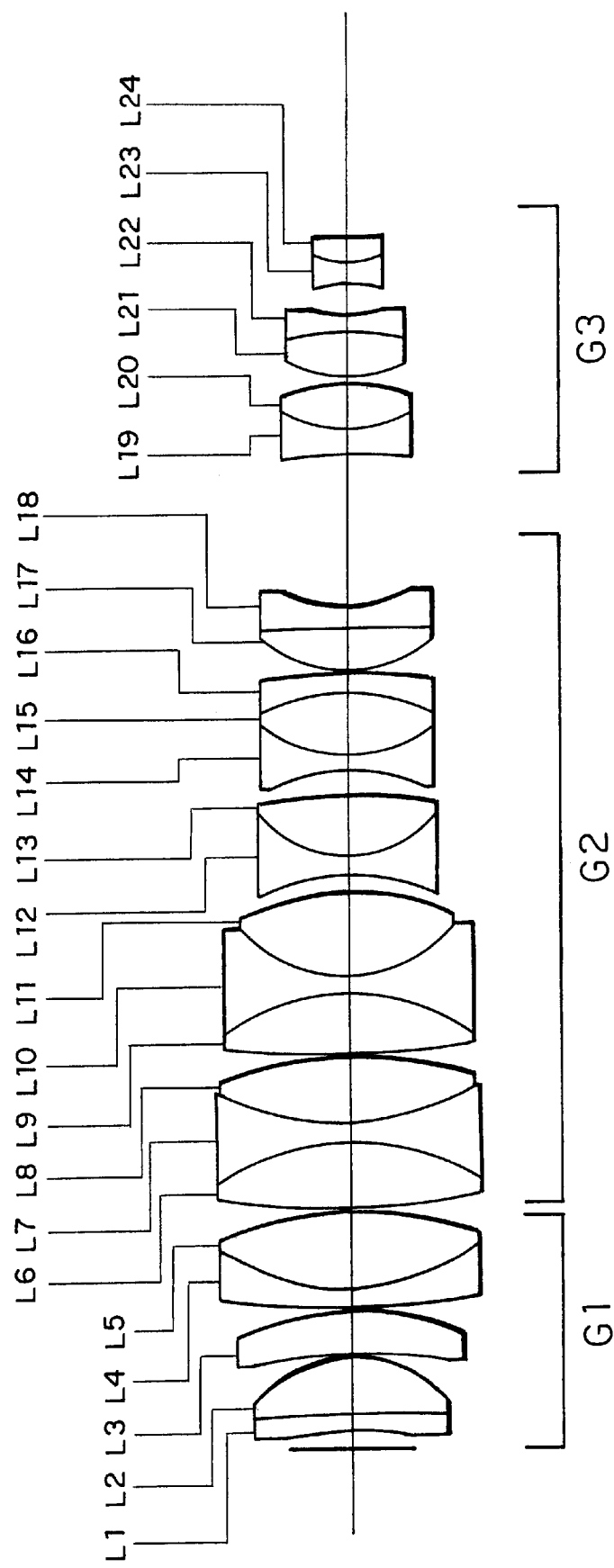
FIG. 3 illustrates the lens construction of a microscope objective lens according to a second embodiment of the present invention.

FIG. 3 illustrates the lens construction of a microscope objective lens according to Second Embodiment. This microscope objective lens comprises, in order from the object side, a first lens group G1, a second lens group G2 and a third lens group G3. The first lens group G1 comprises a meniscus lens with its concave surface facing the object side and a plurality of cemented lenses, and has a positive refractive power on the whole. The second lens group G2 comprises a plurality of cemented lenses and has a positive refractive power on the whole and the third lens group G3 comprises a plurality of cemented lenses and has a negative refractive power on the whole.

Specific values of the present Embodiment are listed in Table 3.

TABLE 3

Total specific values
f = 4.02
NA = 0.55
β = 50X
W.D. = 7.485
Lens data

| No. | R | d | Material | |
|---|---|---|---|---|
| 1 | 0.00 | 7.485 | | |
| 2 | −26.5625 | 1.30 | Quartz | L1 |
| 3 | −127.5017 | 4.10 | Fluorite | L2 |
| 4 | −9.2130 | 0.10 | | |
| 5 | −44.8702 | 3.10 | Fluorite | L3 |
| 6 | −20.3411 | 0.15 | | |
| 7 | 56.5862 | 1.30 | Quartz | L4 |
| 8 | 15.0958 | 5.70 | Fluorite | L5 |
| 9 | −25.5130 | 0.15 | | |
| 10 | 46.0073 | 4.90 | Fluorite | L6 |
| 11 | −16.2574 | 1.35 | BaF$_2$ | L7 |
| 12 | 17.5122 | 4.90 | Fluorite | L8 |
| 13 | −28.8393 | 0.10 | | |
| 14 | 65.6196 | 4.50 | Fluorite | L9 |
| 15 | −14.5208 | 1.30 | Quartz | L10 |
| 16 | 9.8793 | 6.20 | Fluorite | L11 |
| 17 | −17.4204 | 1.10 | | |
| 18 | −15.1415 | 1.30 | Quartz | L12 |
| 19 | 7.6954 | 4.80 | Fluorite | L13 |
| 20 | −27.1941 | 1.50 | | |
| 21 | −14.0609 | 1.30 | Quartz | L14 |
| 22 | 11.1782 | 4.50 | SrF$_2$ | L15 |
| 23 | −11.7254 | 1.30 | Quartz | L16 |
| 24 | −49.6395 | 0.11 | | |
| 25 | 9.1794 | 3.20 | Fluorite | L17 |
| 26 | −648.1708 | 1.35 | Quartz | L18 |
| 27 | 8.329 | 11.50 | | |
| 28 | −41.5761 | 1.90 | Fluorite | L19 |
| 29 | 11.0686 | 3.20 | Quartz | L20 |
| 30 | −11.741 | 0.30 | | |
| 31 | 8.196 | 3.10 | Quartz | L21 |
| 32 | −24.7625 | 1.30 | Fluorite | L22 |
| 33 | 6.0579 | 2.50 | | |
| 34 | −5.596 | 1.30 | Fluorite | L23 |
| 35 | 4.5599 | 2.00 | Quartz | L24 |
| 36 | 27.9908 | | | |

Condition-corresponding values
f1/f = 3.66
f2/f = 46.94
|f3/f| = 23.01

Figure 4:
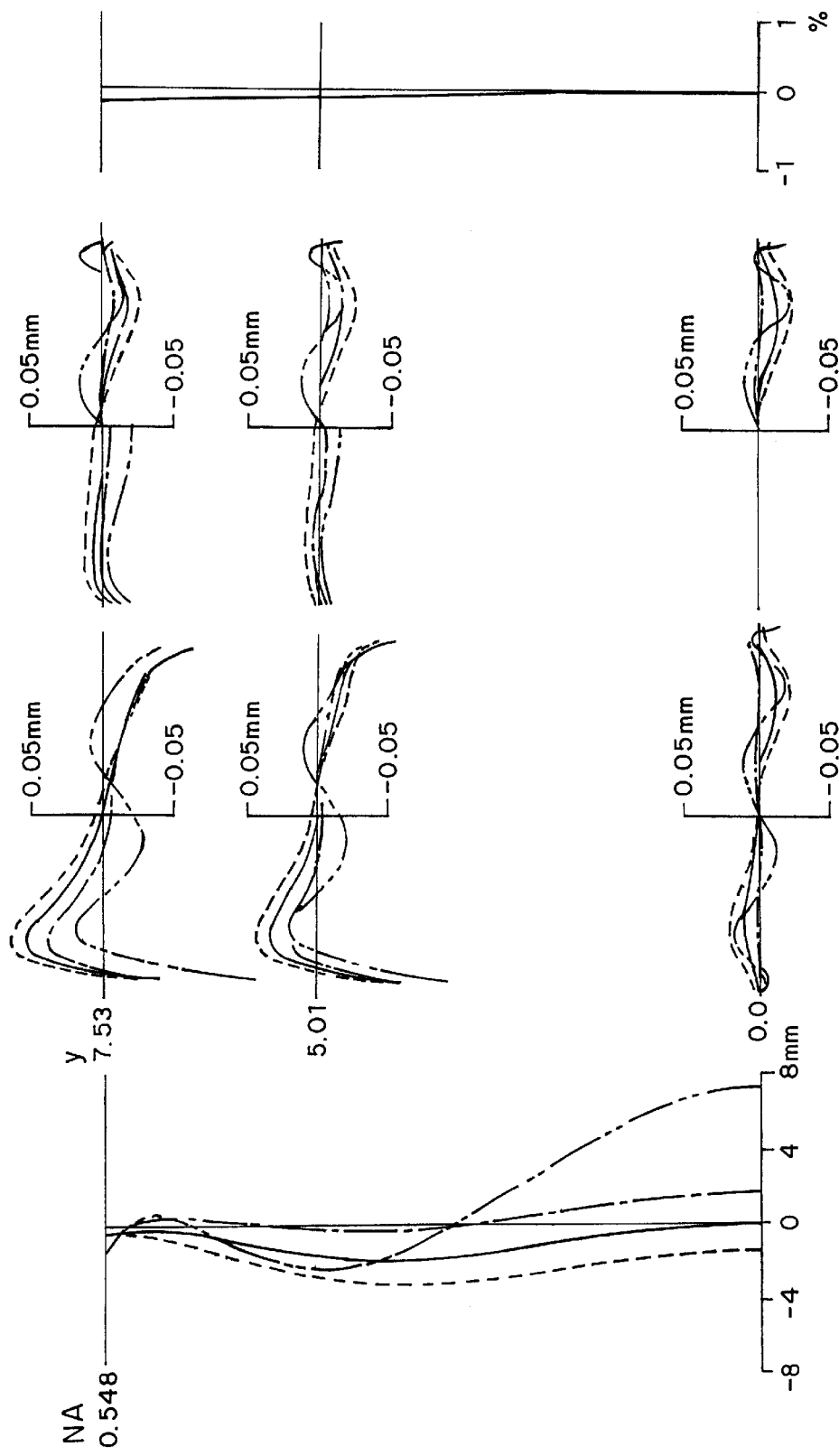
FIG. 4 presents diagrams showing various aberration of the microscope objective lens according to the second embodiment.

FIG. 4 presents diagrams showing various aberrations of the microscope objective lens according to the present Embodiment. As can be seen from the aberration diagrams, various aberrations have well been corrected at wavelengths of 248±3 nm and 486 nm.

FIG. 5 illustrates the lens construction of the imaging lens mentioned previously. Specific values of this imaging lens are listed in Table 4.

TABLE 4

Total specific values
f = 200
Lens data

| No. | R | d | Material |
|---|---|---|---|
| 1 | −30.630 | 2.00 | Quartz |
| 2 | 2406.000 | 5.00 | Fluorite |
| 3 | −39.100 | 1.00 | |
| 4 | −417.400 | 5.00 | Quartz |
| 5 | −51.920 | | |

Incidentally, shown in the aberration diagrams of the above Embodiments are those obtained at 248±3 nm and 486 nm. Without limitations thereto, in the present invention the various aberrations have well been corrected at wavelengths of around 800 nm, too.

What is claimed is:

1. A microscope objective lens comprising, in order from the object side, a first lens group, a second lens group and a third lens group;

said first lens group comprising a meniscus lens with its concave surface facing the object side and a plurality of cemented lenses, and having a positive refractive power on the whole;

said second lens group comprising a plurality of cemented lenses and having a positive refractive power on the whole; and said third lens group comprising a plurality of cemented lenses and having a negative refractive power on the whole;

the lens fulfilling the following conditions (1) to (3):

$$2.5 < f1/f < 5 \tag{1}$$

$$30 < f2/f < 70 \tag{2}$$

$$15 < |f3/f| < 30 \tag{3}$$

where;

f1 is the focal length of the first lens group;

f2 is the focal length of the second lens group;

f3 is the focal length of the third lens group; and f is the focal length of the whole microscope objective lens system.

2. The microscope objective lens according to claim 1, wherein said second lens group has at least three groups of cemented lenses each having at least one cementing surface.

3. The microscope objective lens according to claim 1, wherein said third lens group has at least one group of cemented lens having at least one cementing surface.

4. The microscope objective lens according to claim 1, wherein said first lens group comprises at least one convex meniscus lens, at least one group of cemented lens having at least one cementing surface, and at least one single lens.

5. The microscope objective lens according to claim 1, wherein the lenses of said lens groups each comprise a glass material comprising fluorite, quartz, barium fluoride or strontium fluoride.

6. The microscope objective lens according to claim 1, wherein, in the cemented lenses the microscope objective lens has, lens components are cemented with a cement comprising fluoropolymers.

* * * * *